(12) United States Patent
Zhang

(10) Patent No.: US 11,087,490 B2
(45) Date of Patent: Aug. 10, 2021

(54) METHOD AND DEVICE FOR DETERMINING AREAS OF INTEREST BASED ON GEOLOCATION DATA

(71) Applicant: ADVANCED NEW TECHNOLOGIES CO., LTD., Grand Cayman (KY)

(72) Inventor: Depin Zhang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/176,037

(22) Filed: Feb. 15, 2021

(65) Prior Publication Data

US 2021/0166419 A1 Jun. 3, 2021

Related U.S. Application Data

(63) Continuation of application No. 16/364,917, filed on Mar. 26, 2019, now Pat. No. 10,943,364, which is a
(Continued)

(30) Foreign Application Priority Data

Sep. 30, 2016 (CN) .......................... 201610875370.9

(51) Int. Cl.
*G06T 7/33* (2017.01)
*G06T 7/73* (2017.01)
(Continued)

(52) U.S. Cl.
CPC .................. *G06T 7/73* (2017.01); *G06T 7/11* (2017.01); *H04L 67/18* (2013.01)

(58) Field of Classification Search
CPC ... G06T 7/73; G06T 7/11; H04L 67/18; G06F 16/29
See application file for complete search history.

(56) References Cited

U.S. PATENT DOCUMENTS

| 7,096,030 B2 | 8/2006 | Huomo |
| 7,388,519 B1 | 6/2008 | Kreft |

(Continued)

FOREIGN PATENT DOCUMENTS

| CN | 101887440 A | 11/2010 |
| CN | 101541079 B | 6/2011 |

(Continued)

OTHER PUBLICATIONS

Written Opinion of the International Searching Authority and International Search Report for PCT Application No. PCT/CN2017/102886 dated Dec. 28, 2017 (15 pages).

(Continued)

*Primary Examiner* — Aaron W Carter

(57) ABSTRACT

This application provides a method and a device for determining an area of interest based on geolocation data. The method includes: dividing an area on a map into a plurality of blocks; for each block in the area, determining the number of terminals within the block in a duration as a value of the block in the duration; determining a plurality of anchor points based on the blocks having values greater than a threshold; and obtaining a curve based on some or all of the anchor points, wherein an area bounded by the curve is an area of interest.

20 Claims, 10 Drawing Sheets

Related U.S. Application Data continuation of application No. PCT/CN2017/102886, filed on Sep. 22, 2017.

(51) Int. Cl.
*H04L 29/08* (2006.01)
*G06T 7/11* (2017.01)

(56) References Cited

U.S. PATENT DOCUMENTS

| | | | |
|---|---|---|---|
| 7,953,548 | B2 | 5/2011 | Vengroff et al. |
| 8,073,461 | B2 | 12/2011 | Altman et al. |
| 8,135,505 | B2 | 3/2012 | Vengroff et al. |
| 8,397,171 | B2 | 3/2013 | Klassen et al. |
| 8,401,771 | B2 | 3/2013 | Krumm et al. |
| 8,504,760 | B2 | 8/2013 | Lee et al. |
| 8,589,069 | B1 | 11/2013 | Lehman |
| 8,620,579 | B1 | 12/2013 | Upstill et al. |
| 8,711,181 | B1 | 4/2014 | Nourse et al. |
| 8,948,786 | B2 | 2/2015 | Gillett |
| 9,063,951 | B1 | 6/2015 | Zhu et al. |
| 9,330,563 | B2 | 5/2016 | Rhoads et al. |
| 9,396,344 | B1 | 7/2016 | Jones |
| 9,686,646 | B1 | 6/2017 | Pecard et al. |
| 9,706,355 | B1 | 7/2017 | Cali et al. |
| 9,763,048 | B2 | 9/2017 | Curtis et al. |
| 9,872,147 | B2 | 1/2018 | Wang et al. |
| 9,875,251 | B2 | 1/2018 | Jones |
| 10,204,137 | B2 | 2/2019 | Shim et al. |
| 10,231,084 | B2 | 3/2019 | Bagchi et al. |
| 10,390,180 | B1 | 8/2019 | Li et al. |
| 10,547,968 | B2 | 1/2020 | Jones |
| 10,943,364 | B2 * | 3/2021 | Zhang .................. G06T 7/73 |
| 2004/0190468 | A1 | 9/2004 | Saijonmaa |
| 2005/0020210 | A1 | 1/2005 | Krumm et al. |
| 2005/0032527 | A1 | 2/2005 | Sheha et al. |
| 2006/0069504 | A1 | 3/2006 | Bradley et al. |
| 2007/0005421 | A1 | 1/2007 | Labia et al. |
| 2009/0005987 | A1 | 1/2009 | Vengroff et al. |
| 2009/0098888 | A1 | 4/2009 | Yoon |
| 2011/0041746 | A1 | 2/2011 | Eklund et al. |
| 2011/0087431 | A1 | 4/2011 | Gupta et al. |
| 2011/0090080 | A1 | 4/2011 | Yu |
| 2012/0029817 | A1 | 2/2012 | Khorashadi et al. |
| 2012/0136865 | A1 | 5/2012 | Blom et al. |
| 2013/0103697 | A1 | 4/2013 | Hill et al. |
| 2013/0337830 | A1 | 12/2013 | Haro et al. |
| 2014/0082062 | A1 | 3/2014 | Bellver et al. |
| 2014/0207795 | A1 | 7/2014 | Zhou |
| 2015/0145865 | A1 | 5/2015 | Barnett et al. |
| 2016/0132513 | A1 | 5/2016 | Lim et al. |
| 2016/0253689 | A1 | 9/2016 | Milton et al. |
| 2016/0359986 | A1 | 12/2016 | Jones |
| 2017/0031951 | A1 | 2/2017 | Zhou |
| 2017/0095926 | A1 | 4/2017 | Saboo et al. |
| 2017/0180938 | A1 | 6/2017 | Smith |
| 2017/0238136 | A1 | 8/2017 | Smith |
| 2017/0343353 | A1 | 11/2017 | Mahmoud et al. |
| 2018/0040011 | A1 | 2/2018 | Milton |
| 2018/0070213 | A1 | 3/2018 | Ali et al. |
| 2018/0080794 | A1 | 3/2018 | Wang |
| 2018/0112983 | A1 | 4/2018 | Ahmed et al. |
| 2018/0352041 | A1 | 12/2018 | Tasdemiroglu et al. |
| 2019/0220995 | A1 * | 7/2019 | Zhang .................. H04L 67/18 |
| 2019/0355074 | A1 | 11/2019 | Schwartz et al. |
| 2019/0373405 | A1 | 12/2019 | Jones et al. |
| 2020/0211053 | A1 | 7/2020 | Shishkin et al. |
| 2020/0211060 | A1 | 7/2020 | Shishkin et al. |

FOREIGN PATENT DOCUMENTS

| | | |
|---|---|---|
| CN | 102572992 A | 7/2012 |
| CN | 102750361 A | 10/2012 |
| CN | 103578265 A | 2/2014 |
| CN | 103902636 A | 7/2014 |
| CN | 103944932 A | 7/2014 |
| CN | 104102637 A | 10/2014 |
| CN | 104615881 A | 5/2015 |
| CN | 103578265 B | 7/2015 |
| CN | 104978342 A | 10/2015 |
| CN | 105427003 A | 3/2016 |
| CN | 105893998 A | 8/2016 |
| JP | 2013-509622 A | 3/2013 |
| JP | 2016-503937 A | 2/2016 |
| KR | 10-2012-0088746 A | 8/2012 |
| RU | 2014152872 A | 7/2016 |
| WO | 2004/086791 A1 | 10/2004 |
| WO | 2010129766 A1 | 11/2010 |
| WO | 2016103054 A1 | 6/2016 |

OTHER PUBLICATIONS

Non-final rejection and Search Report for Taiwanese Application No. 106124622 dated Dec. 11, 2018 (6 pages).

International Preliminary Report on Patentability Chapter I for PCT Application No. PCT/CN2017/102886 dated Apr. 11, 2019 (12 pages).

First Office Action and First Search for Chinese Application No. 201610875370.9 dated Jul. 31, 2019 and Jul. 22, 2019 with English machine translation (12 pages).

Chen, "The Research and Application of the Algorithm of Convex Hull on the System of the Block and Control of Street Crime," Donghua University, May 2014 (55 pages).

Search Report for European Application No. 17854765.9 dated Feb. 5, 2020.

Office Action and Search Report for Russian Application No. 2019113130 dated Feb. 12, 2020.

Olivera et al: "Routine-based network deployment for data offloading in metropolitan areas", 2014 IEEE Wireless Communications and Networking Conference (WCNC), Apr. 6-9, 2014, https://ieeexplore.ieee.org/document/6952724/.

Supplementary Search Report for Chinese Application No. 201610875370.9 dated Mar. 6, 2020.

Third Office Action for Chinese Application No. 201610875370.9 dated Mar. 16, 2020.

Office Action for Canadian Application No. 3038583 dated Apr. 20, 2020.

Office Action for Korean Application No. 10-2019-7011270 dated May 25, 2020.

Supplementary Search for Chinese Application No. 201610875370.9 dated May 10, 2020.

1st Examination Report for Australian Application No. 2017335101 dated Nov. 26, 2019 (3 pages).

Supplementary Search for Chinese Application No. 201610875370.9 dated Jan. 10, 2020 (1 page).

Office Action for Japanese Application No. 2019-517065 dated Jun. 16, 2020.

GIS Workshop: Convex hull Process, Tsuzuki Sohken, [online] Oct. 29, 2011, rerieved on May 19, 2020, http://blog.livedoor.jp/g0031067/archives/51833693.html.

First Examination Report for Indian Application No. 201947015796 dated Jan. 21, 2021.

Notice of Allowance for Japanese Application No. 2019-517065 dated Mar. 23, 2021.

* cited by examiner

| 12 | 29  | 84  | 123 | 298 | 123 |
|----|-----|-----|-----|-----|-----|
| 75 | 261 | 310 | 259 | 320 | 123 |
| 66 | 232 | 144 | 133 | 330 | 220 |
| 80 | 123 | 305 | 111 | 123 | 55  |
| 20 | 30  | 35  | 220 | 43  | 45  |

METHOD AND DEVICE FOR DETERMINING AREAS OF INTEREST BASED ON GEOLOCATION DATA

CROSS-REFERENCE TO RELATED APPLICATIONS

The present application is a continuation of U.S. patent application Ser. No. 16/364,917, filed Mar. 26, 2019, which is a continuation application of International Patent Application No. PCT/CN2017/102886, filed on Sep. 22, 2017, which is based on and claims priority to the Chinese Patent Application No. 201610875370.9, filed on Sep. 30, 2016 and entitled "METHOD AND DEVICE FOR DETERMINING AREAS OF INTEREST BASED ON GEOLOCATION DATA." The above-referenced applications are incorporated herein by reference in their entirety.

TECHNICAL FIELD

This application relates to the field of Internet technologies, and in particular, to a method and a device for determining an area of interest based on geolocation data.

BACKGROUND

Nowadays, applications based on geolocation data, especially maps based on geolocation data, have become increasingly popular.

In practice, users may expect to find areas of interest on maps. For example, users expect to go shopping, find entertainment, or have meals in areas of interest; and correspondingly, merchants also expect to set up stores in the areas of interest. Therefore, according to these needs of the users, the areas of interest are generally marked on maps.

In existing technologies, the areas of interest are usually manually determined. However, the efficiency of manually determining the areas of interest is relatively low, and the costs are also relatively large due to the use of manual labor.

SUMMARY

This specification provides a method and a device for determining an area of interest based on geolocation data, to improve the efficiency and reduce the costs for determining the area of interest.

According to one aspect, the method for determining an area of interest based on geolocation data may include: dividing an area on a map into a plurality of blocks; for each block in the area, determining the number of terminals within the block in a duration as a value of the block in the duration; determining a plurality of anchor points based on the blocks having values greater than a threshold; and obtaining a curve based on some or all of the anchor points, wherein an area bounded by the curve is an area of interest.

In some embodiments, the diving an area may comprise: dividing the area based on a side length.

In other embodiments, the determining the number of terminals within the block in a duration as a value of the block in the duration may comprise: receiving geolocation data from the terminals; obtaining locations of the terminals based on the geolocation data; and for each terminal, determining a block where the terminal is located based on the locations of the terminals.

In still other embodiments, an anchor point may be a central point of a block. In yet other embodiments, the curve may encompass all of the anchor points.

In other embodiments, the method may further comprise: obtaining types of Points of Information (POIs) within the area of interest; obtaining the quantities of POIs of same types; and determining a type of POIs of the largest quantity as a type of interest for the area of interest.

In still other embodiments, the method may further comprise: obtaining POIs in the area on the map, and the obtaining a curve based on some or all of the anchor points may comprise: obtaining the curve encompassing all of the POIs and the anchor points.

In yet other embodiments, the obtaining a curve based on some or all of the anchor points may comprise obtaining a curve based on some or all of the anchor points through a convex hull algorithm, and the curve may be a convex hull curve.

In other embodiments, the convex hull algorithm may comprise one or more of a graham algorithm, a jarvis algorithm, a center method, a level method, and a quickhull algorithm.

According to another aspect, the device for determining an area of interest based on geolocation data may include: one or more processors and one or more non-transitory computer-readable memories coupled to the one or more processors and configured with instructions executable by the one or more processors to cause the device to perform operations including: dividing an area on a map into a plurality of blocks; for each block in the area, determining the number of terminals within the block in a duration as a value of the block in the duration; determining a plurality of anchor points based on the blocks having values greater than a threshold; and obtaining a curve based on some or all of the anchor points, wherein an area bounded by the curve is an area of interest.

According to still another aspect, a non-transitory computer-readable storage medium storing instructions is provided. The instructions, when executed by a processor, may cause the processor to perform operations including: dividing an area on a map into a plurality of blocks; for each block in the area, determining the number of terminals within the block in a duration as a value of the block in the duration; determining a plurality of anchor points based on the blocks having values greater than a threshold; and obtaining a curve based on some or all of the anchor points, wherein an area bounded by the curve is an area of interest.

In the embodiments of this application, an area on a map is divided into a number of blocks; for each block in the area, the number of terminals within the block in a duration is determined as a value of the block in the duration; a number of anchor points are determined based on the blocks having values greater than a threshold; a curve is obtained based on some or all of the anchor points, and an area bounded by the curve is an area of interest. In this way, a server or a terminal can determine areas of interest on the map by using geolocation data reported by terminals of users, to avoid low efficiency and high costs inherent in manually demarcating the areas of interest, thereby improving efficiency and reducing costs for determining the areas of interest.

BRIEF DESCRIPTION OF THE DRAWINGS

FIG. 4 is a schematic diagram of an area on a map marked with values of blocks according to some embodiments of this application;

FIG. 5 is a schematic diagram of selected values of blocks according to some embodiments of this application;

DETAILED DESCRIPTION OF THE INVENTION

Embodiments are described in detail herein, and examples of the embodiments are shown in the accompanying drawings. When the following descriptions relate to the accompanying drawings, unless indicated otherwise, same numbers in different accompanying drawings represent same or similar elements. The implementations described in the following embodiments do not represent all implementations consistent with this application. On the contrary, the implementations are merely examples of devices and methods that are described in detail in the appended claims and that are consistent with some aspects of this application.

The terms used in this application are for the purpose of describing embodiments only and are not intended to limit this application. The singular forms of "a" and "the" used in this application and the appended claims are intended to include the plural forms as well, unless the context clearly indicates otherwise. The term "and/or" used in this specification refers to and includes any or all possible combinations of one or more associated listed items.

Although the terms such as "first," "second," and "third," may be used in this application to describe various information, the information should not be limited to these terms. These terms are only used to distinguish information of the same type. For example, without departing from the scope of this application, the first information may also be referred to as the second information, and similarly, the second information may also be referred to as the first information. Depending on the context, the word "if" used herein may be interpreted as "while" or "when," or "in response to determination."

In the existing technologies, areas of interest on maps are generally obtained through manual division. Because manual division is usually easily affected by subjective views, edges of the manually divided areas of interest may have relatively large errors. For example, places that are not areas of interest may be easily put into the areas of interest, or places that belong to areas of interest may not be put into the areas of interest.

Figure 1:
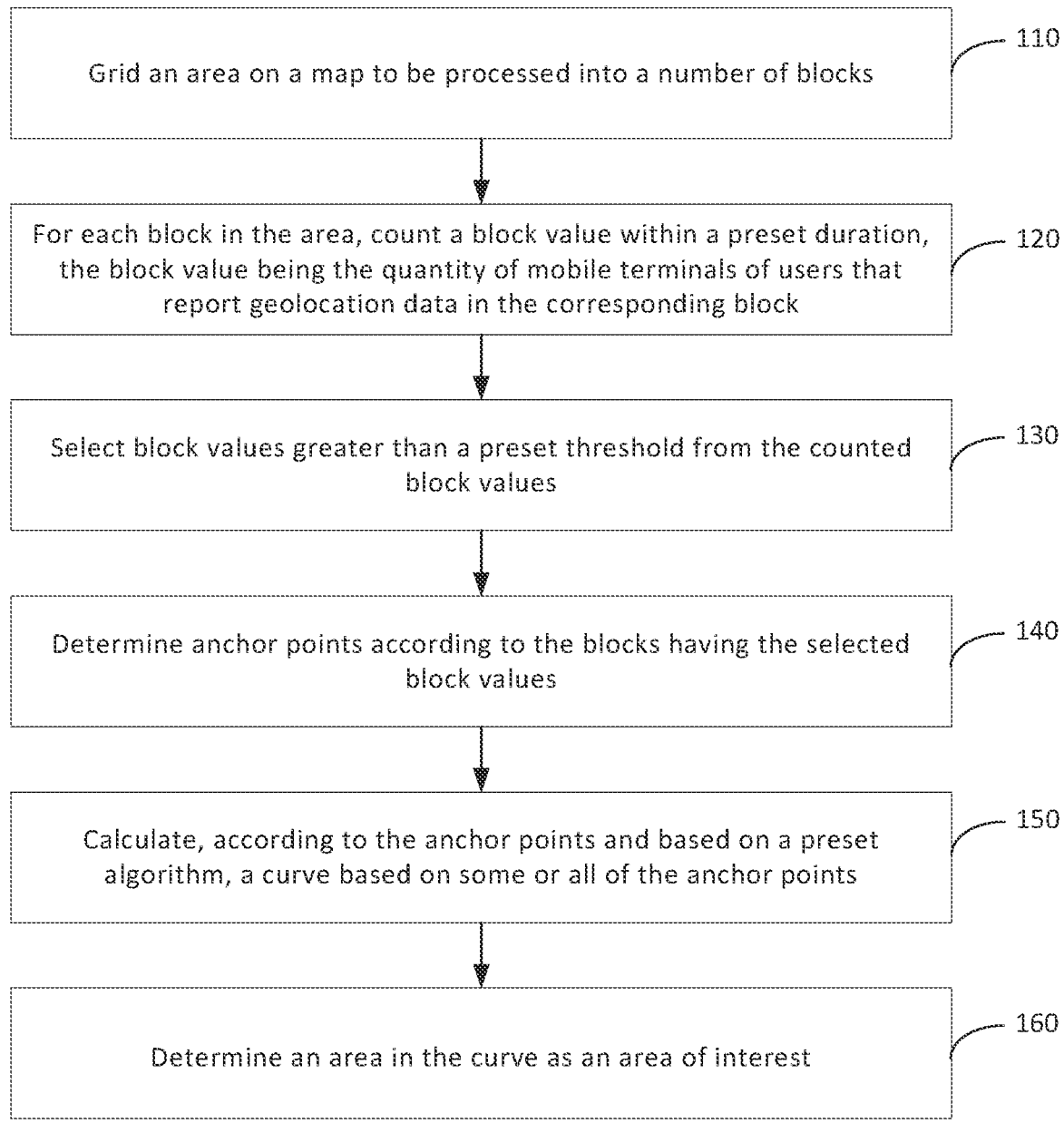
FIG. 1 is a flowchart of a method for determining an area of interest based on geolocation data according to some embodiments of this application.

To resolve the foregoing problem, FIG. 1 shows a flowchart of a method for determining an area of interest based on geolocation data according to some embodiments of this application. The method may be applied on a server, and the method includes the following steps.

Step 110: grid an area on a map to be processed into a number of blocks.

In some embodiments, the area on the map to be processed may be selected manually, such as circled on the map by a programmer running the server. In other embodiments, the area on the map to be processed may be determined by the server according to a list of regions. The list of regions may be preset, and various regions are included in the list. For example, a region A, a region B, and a region C are included in the region list, where areas of interest in the region A have been determined; and the server may determine, according to the list, that the region B is an area to be processed. After areas of interest of the B region have been determined, the server may determine the region C as an area to be processed. In yet other embodiments, the server may determine an area on a map to be processed according the list of regions in other manners or based on other criteria.

In some embodiments, the gridding of the area may include: dividing, by the server, the area on the map to be processed into at least one block according to a preset side length. For example, the preset side length may be an empirical value manually preset.

Figure 2:
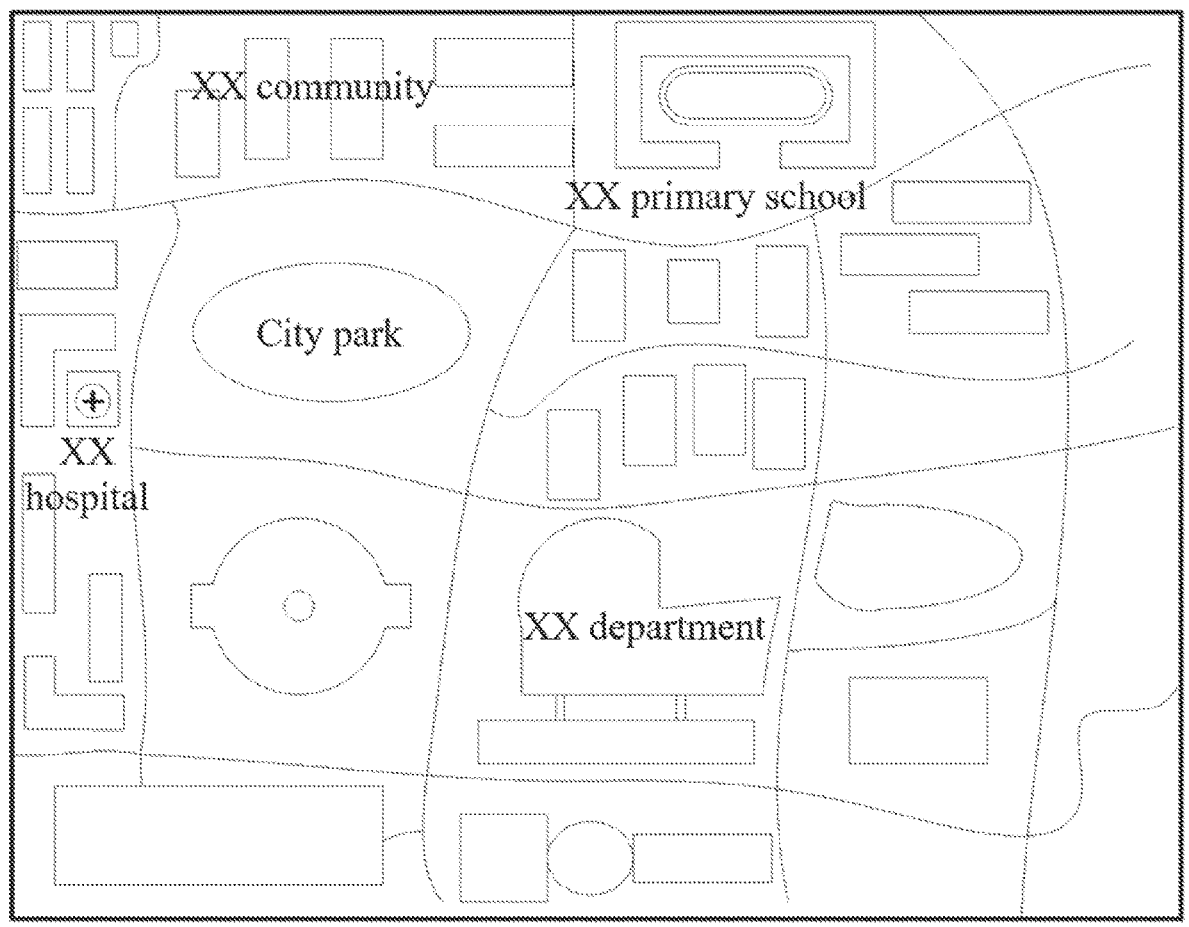
FIG. 2 is a schematic diagram of an area on a map according to some embodiments of this application.
Figure 3:
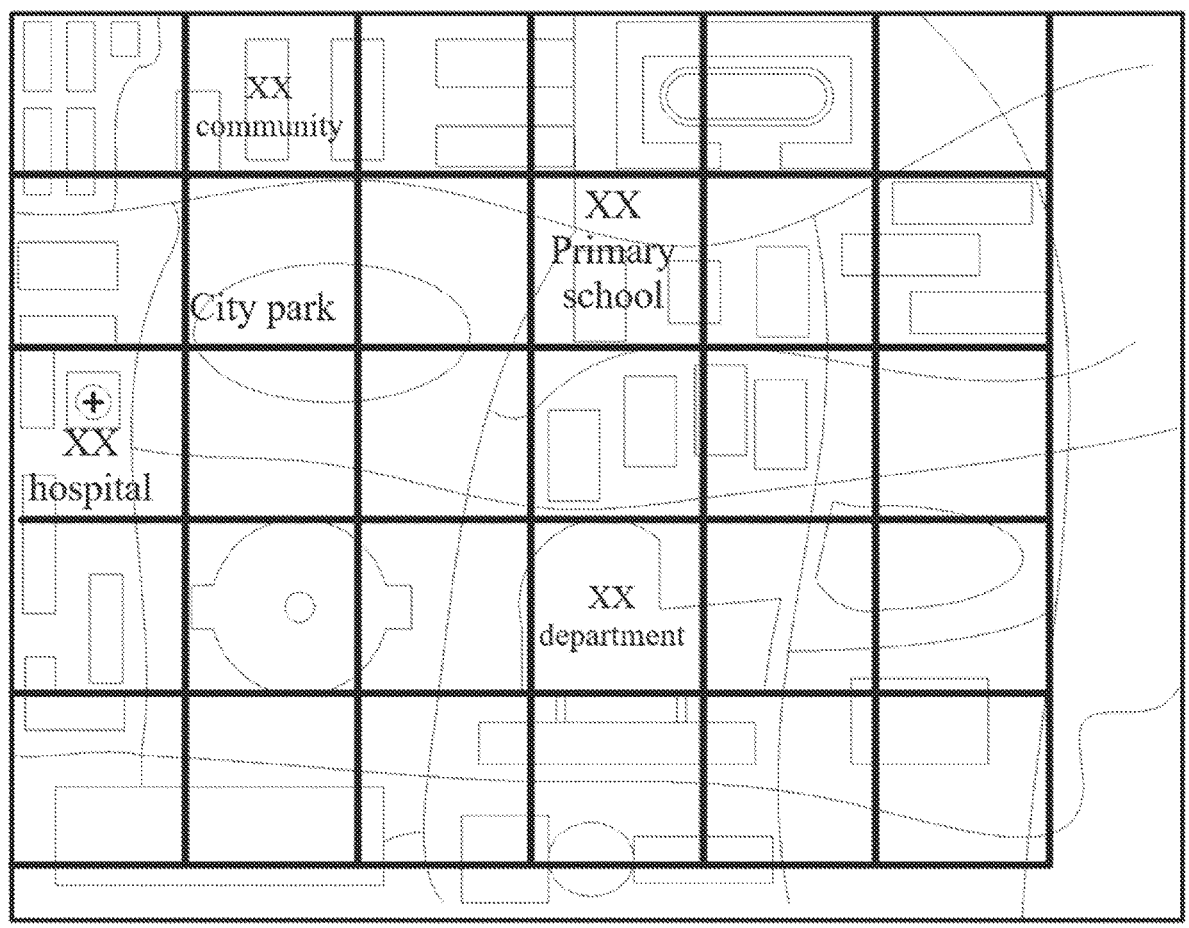
FIG. 3 is a schematic diagram obtained after the area on the map is gridded according to some embodiments of this application.

FIG. 2 is a schematic diagram of an area on a map according to some embodiments of this application. As shown in FIG. 2, the area on the map may have a length of 1300 meter (m) and a width of 1050 meter (m). For example, a side length for area division may be set as 200 m, that is, the area on the map may be divided into several blocks based on the side length of 200 m. FIG. 3 is a schematic diagram obtained after the area on the map is gridded according to some embodiments of this application. Following the above example, the side length of each block in the area shown in FIG. 3 is 200 m, and by gridding, the area on the map may be divided into blocks of the same size. As shown in FIG. 3, portions on the edges of the area on the map having sides shorter than the preset side length may not be gridded. Alternatively, portions having sides shorter than the preset side length may also be gridded.

In other embodiments, the gridding of the area on the map may include: dividing, by the server, the area on the map to be processed into a preset quantity of blocks. The preset quantity may be an empirical value manually preset. For example, the area on the map is divided into 100 blocks.

Step 120: for each block in the area, count a block value within a preset duration, the block value being the quantity of mobile terminals of users that report geolocation data in the corresponding block.

In some embodiments, the reported geolocation data may be uploaded by a mobile terminal of a user through an application installed in the mobile terminal. For example, in a mobile payment scenario, a mobile terminal of a user may cooperate with a device of an interacting party to jointly complete a payment process. The interacting party may be another user or an entity interacting with this user. The device of the interacting party may be another mobile terminal, or a unportable terminal device. The process may also involve a third party providing a payment service besides the two or more interacting parties. The third-party provider may provide a security interaction service while providing this type of third-party payment services.

The third-party payment service provider may set up its own website or provide a server dedicated to handling payment, for example, a payment platform. In this way, two or more parties may complete payment by using the service provided on the payment platform. For example, the payment platform may be eBay or Alibaba. The mobile terminal and/or the unportable terminal may access, through the Internet, a payment platform provided by the third-party payment service provider, and complete a process of payment by using the payment platform. In addition, for convenience and security, the mobile terminal and/or the unportable terminal may be installed with a dedicated client (e.g., an application). For example, an application provided by the third-party payment service provider may be installed to complete payment efficiently.

In some embodiments, the geolocation data may indicate a location of the mobile terminal on which the client is installed. For example, the geolocation data may include coordinate information of the geolocation of the mobile terminal, recorded by a positioning device of the mobile terminal. Examples of the positioning device may use the USA Global Positioning System (GPS) satellite navigation system, the Europe "Galileo" satellite navigation system, the Russia Global Navigation Satellite System (GLONASS), or the China "BeiDou" satellite navigation system, or a combination thereof. The coordinate information for positioning is also referred to as mobile positioning. Moreover, the reported geolocation data may further carry a reported timestamp. The timestamp may indicate a time at which the positioning device determines the geolocation data; or a time at which the client on the mobile terminal reports the geolocation data.

In other embodiments, the geolocation data may be obtained through conversion by a network device based on features of signals of the mobile terminal on which the client resides. For example, a network operator may use signals of the mobile terminal to calculate the geolocation data of the mobile terminal based on base station positions according to a base station coverage principle. For example, the mobile terminal measures downlink pilot signals of different base stations to obtain a time of arrival (TOA) of the downlink pilot signal of each base station or a time difference of arrival (TDOA) among the downlink pilot signals of the different base stations, and uses the measurement results and coordinates of the base stations to calculate the location of the mobile terminal according to a triangulation algorithm. In some embodiments, three or more base stations may be used. The more base stations are measured, the higher precision the measurement has. Thus, positioning performance is more significantly improved.

In still other embodiments, the geolocation data may be obtained by combining the method of the positioning device on the mobile terminal and the positioning method based on base stations described above. This way, the obtained geolocation data may be more accurate.

In some embodiments, the uploaded geolocation data may include longitudes and latitudes of the locations of the terminals. According to the longitudes and latitudes, it may be determined within which block in the area on the map each of the locations of the terminals indicated by the upload geolocation data is. That is, for each terminal, a block where the terminal is located may be determined based on the longitude and latitude of the terminal's location. Moreover, a block value for each block within a preset duration may be determined according to the timestamps in the geolocation data. For example, the number of terminals of users that report location information in each block are counted and used as the block value for the corresponding block. In some embodiments, the preset duration may be an empirical value manually preset, such as, one day. A block value for each block within one day may be determined.

By counting the quantity of terminals of users, the popularity of the area corresponding to each block within the preset duration may be reflected. A larger block value indicates that more users are in the block, and an area corresponding to the block tends to be an area of interest; on the contrary, a smaller block value indicates that fewer users are in the block, and an area corresponding to the block is likely not an area of interest.

Step 130: select block values greater than a preset threshold from the counted block values.

In some embodiments, the preset threshold may be an empirical value preset manually. In the foregoing example of FIG. 3, after the quantity of mobile terminals of users that report geolocation data in each block are counted, the block value for each block may be obtained. FIG. 4 is a schematic diagram of an area on a map marked with block values according to some embodiments. In FIG. 4, for clarity, the map in FIG. 3 is omitted, and only blocks are retained and labeled with block values.

Figure 5:
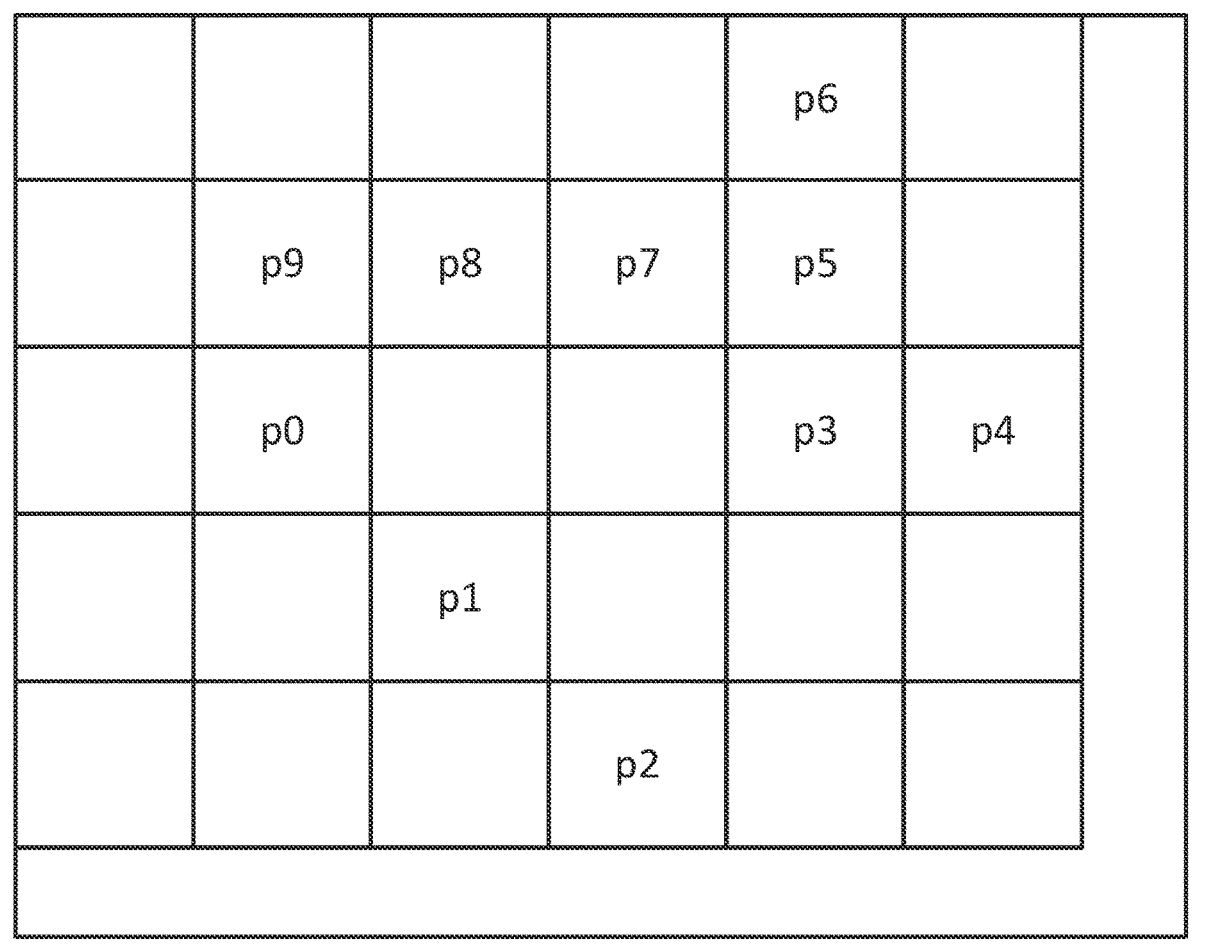

Assuming that the preset threshold is 200, a block having a block value greater than 200 may be selected. FIG. 5 is a schematic diagram showing the selected block values according to some embodiments of the application. As shown in FIG. 5, the blocks having the block values greater than 200 are labeled with serial numbers p0 to p9 respectively.

Step 140: determine anchor points according to the blocks having the selected block values.

An anchor point may refer to the point used to locating an area, such as an area of interest. In some embodiments, the anchor point may be a central point of the block having a selected block value. In other embodiments, the anchor point may be any of other points in the block, e.g., a vertex of the block, a point at a distance from the central point (such as at ½ or ⅓ of the way from the vertex to the central point).

In some embodiments, the anchor point may be determined in the following manner. For block values of two neighboring blocks, where one is greater than a preset threshold, and the other one is less than the preset threshold, the anchor point may be determined based on a ratio of the two block values. For example, when one block value is 100, and the other block value is 300, while the threshold is 200, the anchor point may be set at ⅓ of the way from the block with the value of 300 to the block with the value of 100 (such as from the central point of the former block to that of the latter block). In other examples, the anchor point may be set at ½ the distance between the two blocks.

Step 150: calculate according to the anchor points and based on a preset algorithm, a curve based on some or all of the anchor points.

In some embodiments, a preset algorithm may be used to calculate the curve based on some or all of the anchor points. For example, a point set X {X1, X2, . . . , Xn} may be labeled on a two-dimensional plane, and after the outermost points are connected, a curve encompassing all points in the point set X may be formed. For example, the curve may be a closed polygonal chain (which includes multiple connected lines) enclosing all the points in the point set X.

In some embodiments, the preset algorithm may be a convex hull algorithm, and the curve may be a convex hull curve. For example, the convex hull algorithm is used in a real-number vector space, and for a given point set X {X1, X2, . . . , Xn}, an intersection S of all convex sets including the point set X is referred to as a convex hull of X. The convex hull of X may be formed by a linear combination of all points (X1, . . . , Xn) in X. In a point set on a two-dimensional plane, a convex hull is a convex polygon formed by connecting the outermost points, and the convex polygon may include or surround all points in the point set. Examples of the convex hull algorithm may include, but not be limited to, a graham algorithm, a jarvis algorithm, a center method, a level method, and a quickhull algorithm.

Figure 6:
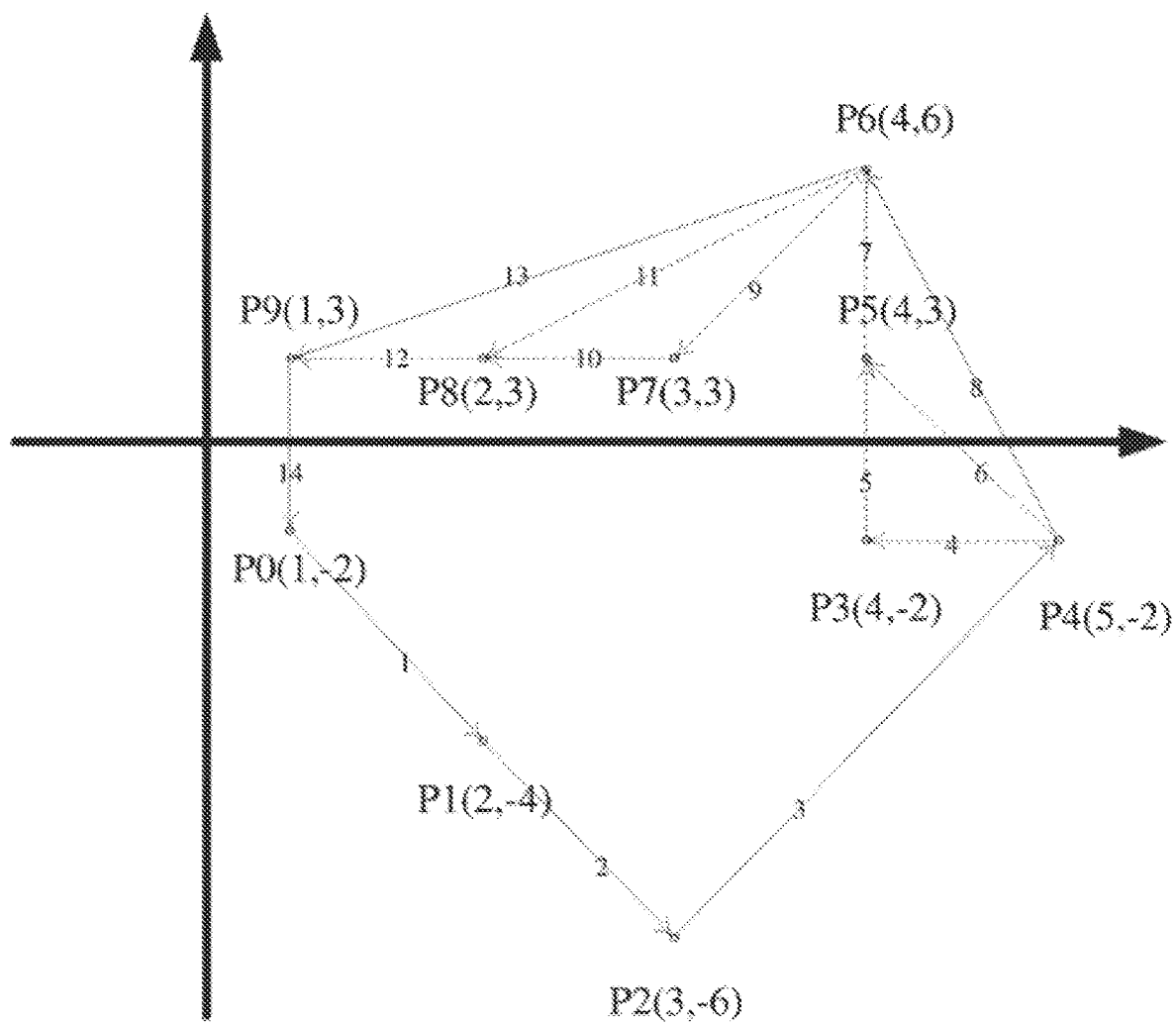
FIG. 6 is a schematic diagram of a coordinate system established according to some embodiments of this application.

The graham algorithm is used as an example below for description. Based on the blocks with selected block values shown in FIG. 5, a coordinate system is established as shown in FIG. 6, where the serial numbers p0, p1, p2, p3, p4, p5, p6, p7, p8, p9 of the blocks with selected values are also used to represent the anchor points determined in these blocks.

In some embodiments, the coordinates of each point in the point set {p0, p1, p2, p3, p4, p5, p6, p7, p8, p9} are formed by longitudes and latitudes, where the longitudes are on an X axis, and the latitudes are on a Y axis. For ease of description, the coordinates are simplified as integers. In FIG. 6, it is assumed that coordinates of p0 are (1, −2); coordinates of p1 are (1, 2); coordinates of p2 are (1, −2); coordinates of p3 are (1, 2); coordinates of p4 are (1, −2); coordinates of p5 are (1, 2); coordinates of p6 are (1, −2); coordinates of p7 are (1, 2); coordinates of p8 are (1, −2); and coordinates of p9 are (1, −2).

An operation process of the convex hull algorithm is described in detail as follows.

A1: select a point from all points as a base point.

In some embodiments, the selecting a base point may be performed in any one of the following manners.

First: a point with the minimum Y coordinate in all points may be selected as a base point. If there are two or more points with the minimum Y coordinate, a point with the minimum X coordinate is selected.

Second: a point with the minimum X coordinate in all points may be selected as a base point. If there are two or more points with the minimum X coordinate, a point with the minimum Y coordinate is selected.

Third: a point with the maximum Y coordinate in all points may be selected as a base point. If there are two or more points with the maximum Y coordinate, a point with the maximum X coordinate is selected.

Fourth: a point with the maximum X coordinate in all points may be selected as a base point. If there are two or more points with the maximum X coordinate, a point with the maximum Y coordinate is selected.

In some embodiments, the second manner is used, i.e., a point with the minimum X coordinate is selected. As shown in FIG. 6, p0 and p9 both have the minimum X coordinate, then a point with the minimum Y coordinate is selected, i.e., p0 is selected as the base point.

A2: sort the other points according to cosine values of included angles between the X axis and vectors formed by the other points and the base point.

In some embodiments, for any triangle, the square of any side is equal to the sum of the squares of the other two sides minus twice the product of the two sides and the cosine of the included angle of the two sides.

Assuming that three sides of an triangle are a, b, and c, and three angles of the triangle are A, B, and C, the cosine values of the angles can be calculated by using the following formulas:

$$\cos A = \frac{(b^2 + c^2 - a^2)}{2bc} \quad \text{formula 1}$$

$$\cos B = \frac{(a^2 + c^2 - b^2)}{2ac} \quad \text{formula 2}$$

$$\cos C = \frac{(a^2 + b^2 - c^2)}{2ab} \quad \text{formula 3}$$

where the range of the cosine values is [−1, 1]. In the Cartesian coordinate system, the cosine values are positive while in the first and fourth quadrants, negative while in the second and third quadrants, and 0 on the X axis or the Y axis.

After the cosine values of included angles of the vectors formed by all other points and the base point are obtained according to the foregoing formulas, the cosine values are sorted in a descending order, and an order of the points corresponding to the cosine values may be obtain, e.g., p0, p1, p2, p4, p3, p5, p6, p7, p8, p9.

A3: iterate through the points according to the sorted order, and retain the points with a vector product greater than 0 to obtain a convex hull curve.

In some embodiments, the vector product is a binary operation of vectors in a vector space, and can be calculated as follows:

$$\left| \overrightarrow{AB} \times \overrightarrow{BC} \right| = |\overrightarrow{AB}| \cdot |\overrightarrow{BC}| \cdot \sin\theta \quad \text{formula 4}$$

where sin θ is a sine value of a vector AB and a vector BC, and a result of the vector product may be a positive value, a negative value, or 0.

When a vector product of the vector AB and the vector BC is greater than 0, it indicates that the vector AB is in the clockwise direction of the vector BC; and the point B is retained. When the vector product of the vector AB and the vector BC is less than 0, it indicates that the vector AB is in the anticlockwise direction of the vector BC; and the point B is deleted, and points A and C are connected to form a vector AC. When the vector product of the vector AB and the vector BC is equal to 0, it indicates that the vector AB is collinear with the vector BC; and the point B is deleted, and points A and C are connected to form a vector AC.

For example, steps (1-14) of iterating over the points include the following, as shown in FIG. 6.

1: First, connect p0 and p1 to form a vector p0p1.

2: Connect p1 and p2 to form a vector p1p2.

Because a vector product of the vector p0p1 and the vector p1p2 is 0, p1 is deleted, and p0 and p2 are connected to form a vector p0p2.

3: Connect p2 and p4 to form a vector p2p4.

Because a vector product of the vector p0p2 and the vector p2p4 is greater than 0, p2 is retained.

4: Connect p4 and p3 to form a vector p4p3.

Because a vector product of the vector p2p4 and the vector p4p3 is greater than 0, p4 is retained.

5: Connect p3 and p5 to form a vector p3p5.

Because a vector product of the vector p4p3 and the vector p3p5 is less than 0, p3 is deleted.

6: Connect p4 and p5 to form a vector p4p5.

Because a vector product of the vector p2p4 and the vector p4p5 is greater than 0, p4 continues to be retained.

7: Connect p5 and p6 to form a vector p5p6.

Because a vector product of the vector p4p5 and the vector p5p6 is less than 0, p5 is deleted.

8: Connect p4 and p6 to form a vector p4p6.

Because a vector product of the vector p2p4 and the vector p4p6 is greater than 0, p4 continues to be retained.

9: Connect p6 and p7 to form a vector p6p7.

Because a vector product of the vector p4p6 and the vector p6p7 is greater than 0, p6 is retained.

10: Connect p7 and p8 to form a vector p7p8.

Because a vector product of the vector p6p7 and the vector p7p8 is less than 0, p7 is deleted.

11: Connect p6 and p8 to form a vector p6p8.

Because a vector product of the vector p4p6 and the vector p6p8 is greater than 0, p6 continues to be retained.

12: Connect p8 and p9 to form a vector p8p9.

Because a vector product of the vector p6p8 and the vector p8p9 is less than 0, p8 is deleted.

13: Connect p6 and p9 to form a vector p6p9.

Because a vector product of the vector p4p6 and the vector p6p9 is greater than 0, p6 continues to be retained.

14: Connect p9 and p0 to form a vector p9p0.

Because a vector product of the vector p6p9 and the vector p9p0 is greater than 0, p9 is retained.

The retained points include p0, p2, p4, p6, and p9, and a curve formed by the vector p0p2, the vector p2p4, the vector p4p6, the vector p6p9, and the vector p9p0 is a convex hull curve.

Step 160: determine an area in the curve as an area of interest.

Figure 7:
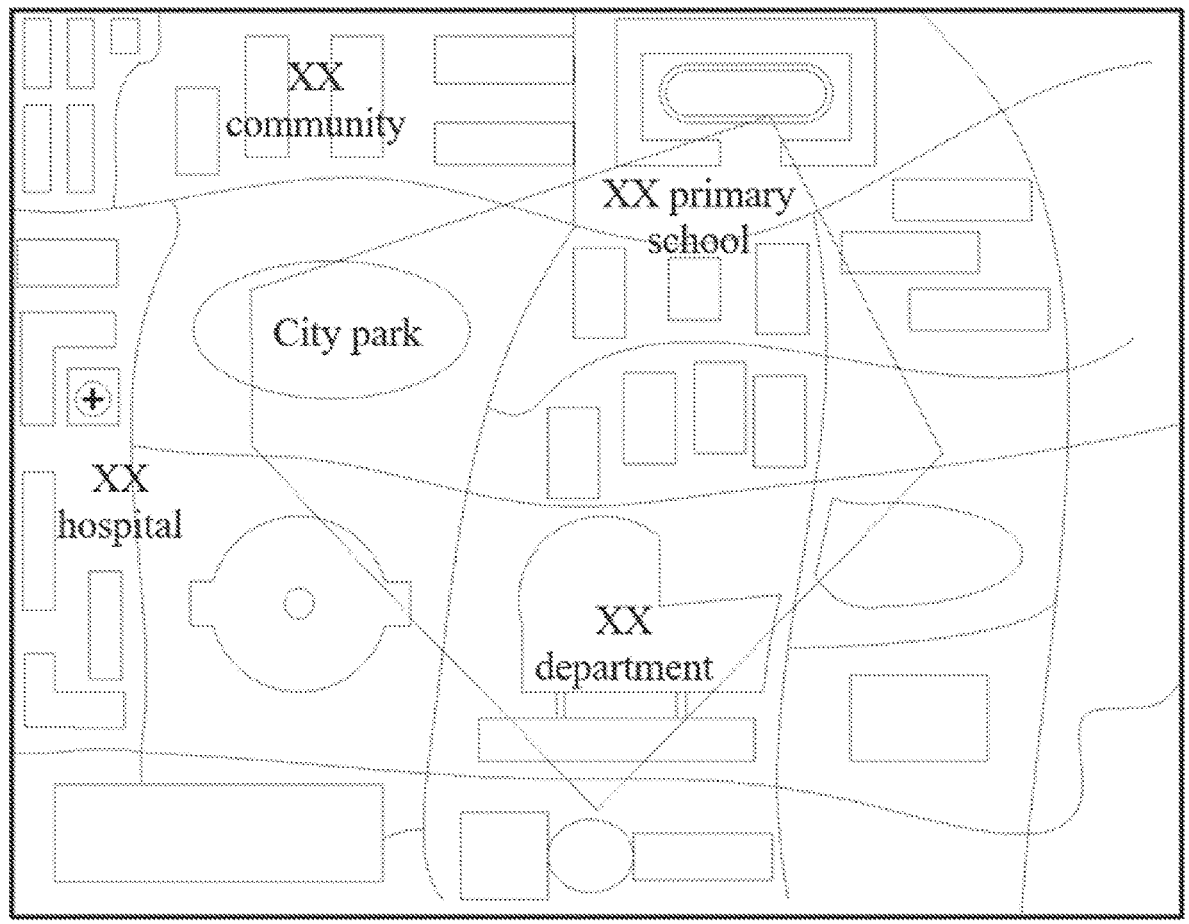
FIG. 7 is a schematic diagram of an area of interest determined based on anchor points according to some embodiments of this application.

FIG. 7 is a schematic diagram of an area of interest determined based on anchor points according to some embodiments of this application. The curve (e.g., the edge of the area of interest) in FIG. 7 encompasses all points in the set (p0 to p9).

According to the embodiments of the application, first, the server divides an area on a map to be processed into a number of blocks, counts the number of mobile terminals of users within each block as a block value for the each block, selects block values greater than a preset threshold, determines anchor points in the blocks corresponding to the selected block values, calculates a curve encompassing all the anchor points based on a preset algorithm, and determines an area in the curve as an area of interest. In this way, the server can determine areas of interest in the area on the map by using geolocation data reported by mobile terminals of users, to avoid low efficiency and high costs inherent in manually demarcating the areas of interest, thereby improving efficiency and reducing costs for determining the areas of interest.

In some embodiments, different areas of interest have different types. For example, a food plaza may be of a catering type, a residential area may be of a community type, etc. In some embodiments, after the Step 160, the method may further include the following steps: obtaining types of Points of Information (POIs) in the curve; counting the quantities of POIs of same types; and determining a type of POIs of the largest quantity as a type of interest for the area of interest.

In some embodiments, a Point of Information (POI) is an information point provided by a map. For example, the POI may be an information point provided by the map where the area to be processed is, or by other maps. A POI may refer to a place, such as a large-scale mall, a supermarket, a school, or a residential area. A POI may have a type for distinguishing from other POIs of different functions, such as a catering type, a community type, a school campus type, a hospital type, a shopping type, etc.

In some embodiments, the server or terminal may count the numbers of POIs of same types in an area of interest, and determine a type of POIs of the largest number as a type of interest for the area of interest. In this way, the type of interest may be labeled in the obtained area of interest, so that users can quickly learn of the type of the area of interest, thereby improving user experience.

In practice, the geolocation data reported by the mobile terminals of users may have errors. For example, a positioning device of a mobile terminal has a deviation in positioning, causing a deviation of the reported geolocation data. In another example, when the mobile terminal disables the positioning device, the mobile terminal is still able to upload geolocation data, but the uploaded geolocation data indicates a geolocation of the hotspot (such as WiFi) connected to the mobile terminal or of a base station. Thus, the geolocation data also has a deviation.

To resolve the foregoing problem, in some embodiments, the method may further include: obtaining POIs in the area on the map after the anchor points are determined in the blocks having the selected block values (the foregoing Step 140). Correspondingly, the Step 150 may include: calculating, according to the POIs and the anchor points and based on the preset algorithm, the curve encompassing all the anchor points and POIs.

As describe above, the POIs are information points provided by a map. For example, the POIs may be information points provided by the map where the area to be processed is, or by other maps. The POIs may refer to places, such as a large-scale mall, a supermarket, a school, a residential area, etc. The POIs may represent some interests of users, and geolocation data of the POIs is generally accurate.

In some embodiments, the server calculates, according to the anchor points and the obtained POIs and based on a preset algorithm, a curve encompassing all the anchor points and POIs. A calculation process of the preset algorithm may have been shown in the foregoing embodiments, and will not be repeated herein.

Figure 8:
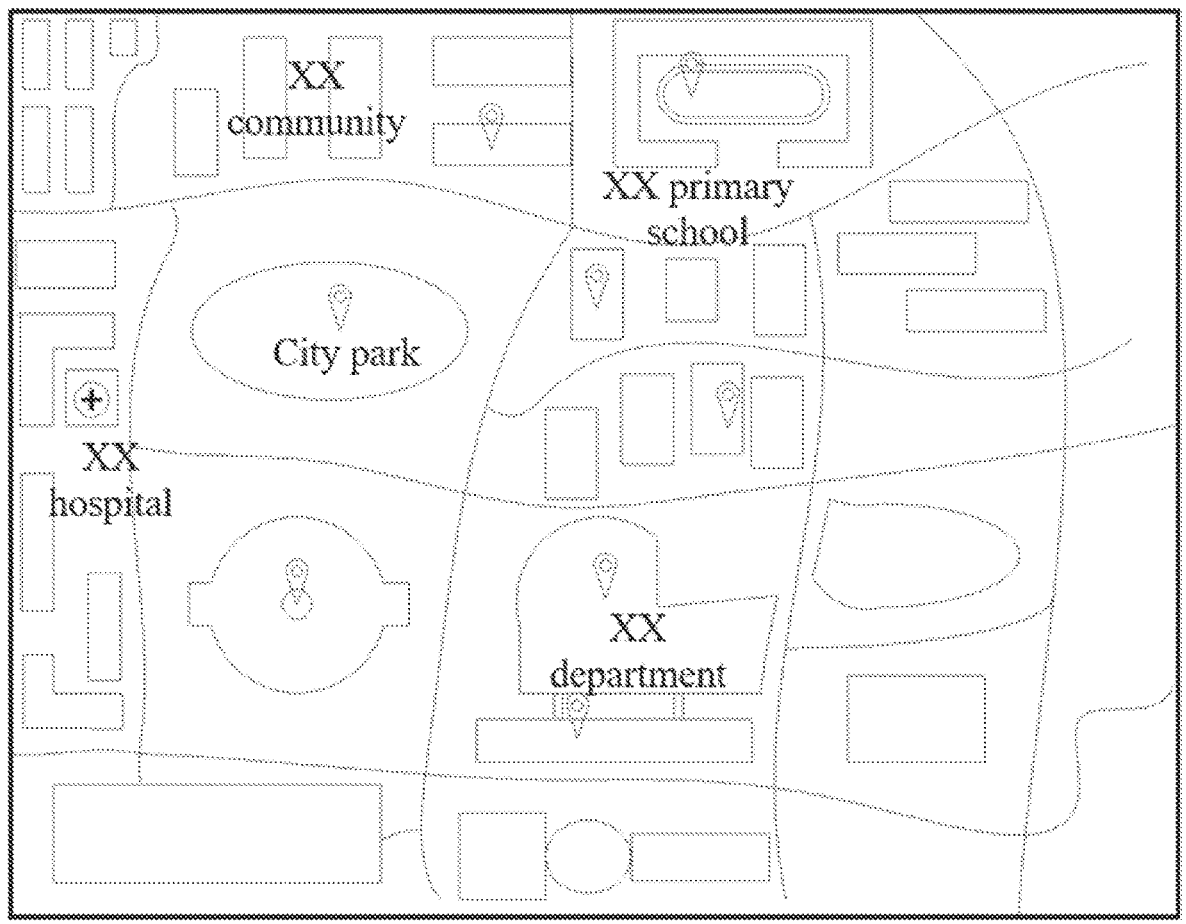
FIG. 8 is a schematic diagram of the area on the map shown in FIG. 2 marked with POIs according to some embodiments of this application.
Figure 9:
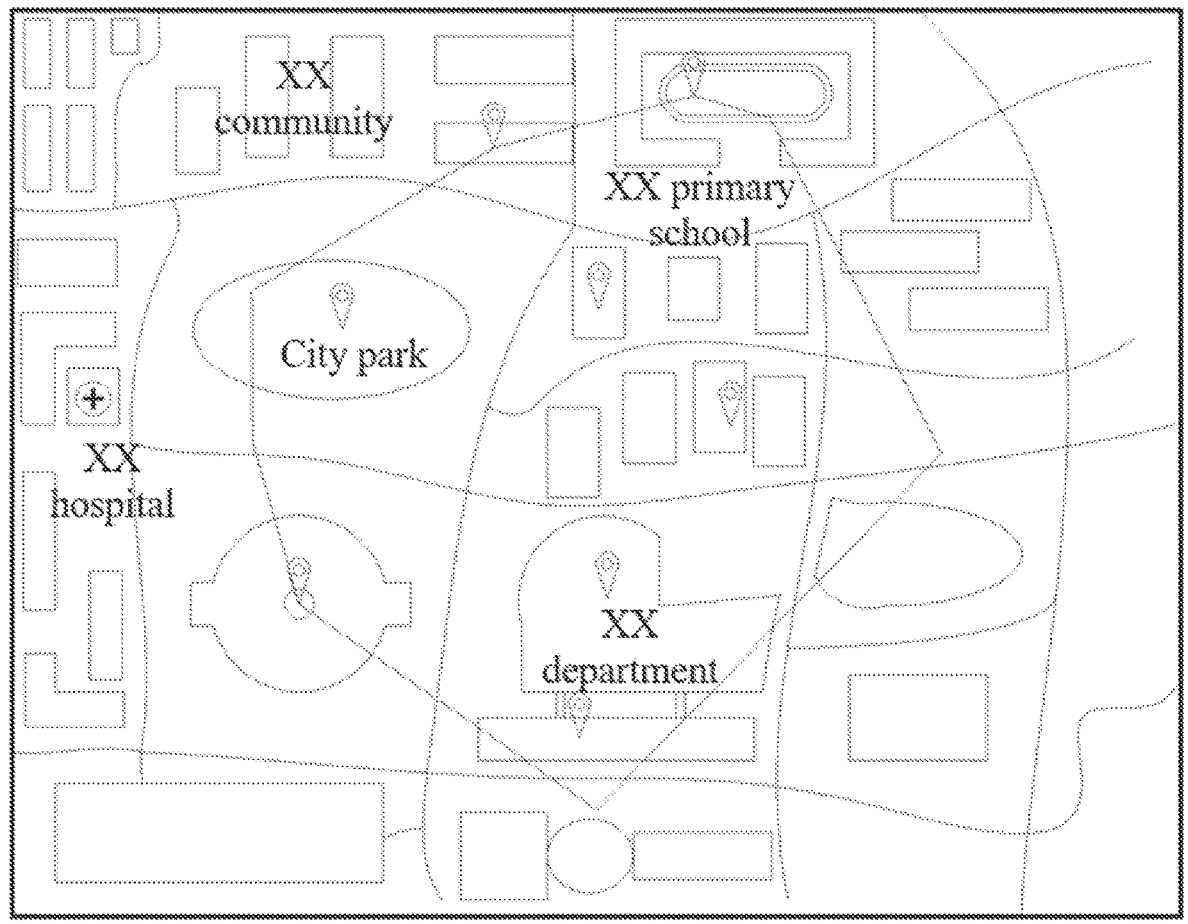
FIG. 9 is a schematic diagram of an area of interest determined based on the POIs and the anchor points according to some embodiments of this application.

FIG. 8 is a schematic diagram of the area on the map shown in FIG. 2 marked with POIs according to some embodiments of this application. Correspondingly, FIG. 9 is a schematic diagram of an area of interest determined based on the POIs and the anchor points. Compared with the area of interest shown in FIG. 7, additional popular places are added in the area of interest shown in FIG. 9, so that the area of interest is more accurate. In some embodiments, the POIs may be used to modify the geolocation data reported by mobile terminals of users, so that the obtained area of interest is more accurate.

Corresponding to the foregoing embodiments of the method for determining an area of interest based on geolocation data, this application further provides embodiments of a device for determining an area of interest based on geolocation data.

Figure 10:
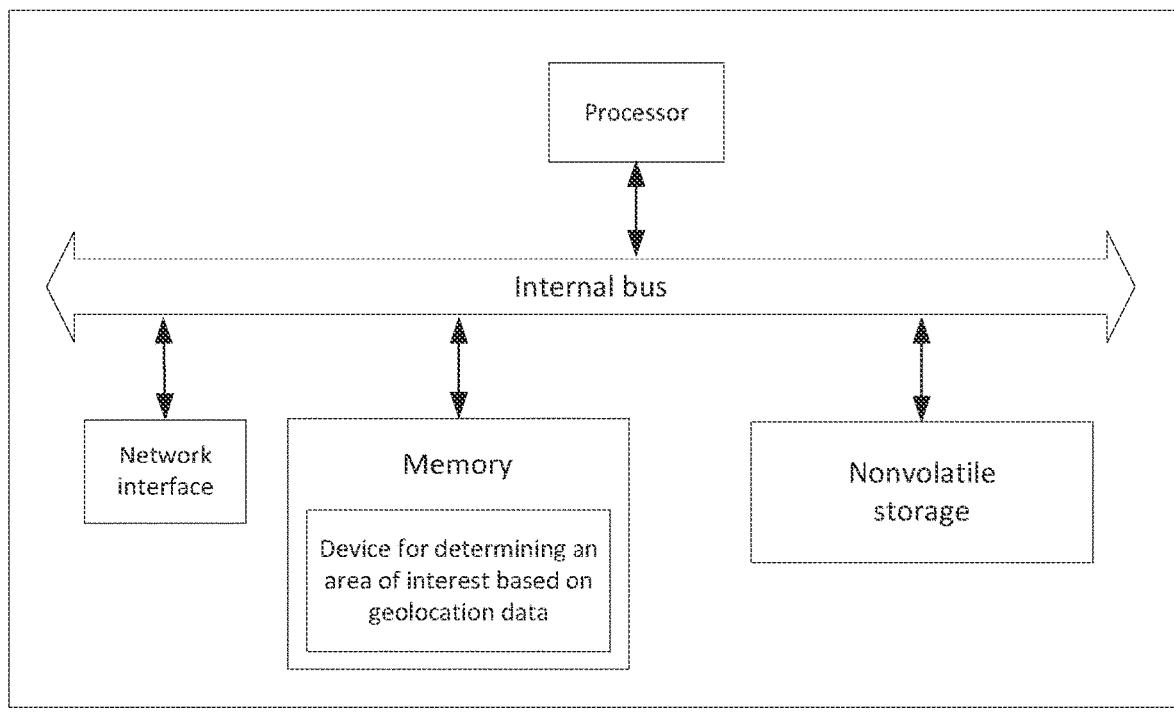
FIG. 10 is a hardware structural diagram of an equipment which includes a device for determining an area of interest based on geolocation data according to some embodiments of this application.

The embodiments of the device for determining an area of interest based on geolocation data in this application may be applied to a server device. The device embodiments may be implemented by using software, or hardware or in a manner of a combination of software and hardware. Taking software implementation as an example, a device in a logical meaning is formed by a processor of the equipment in which the device resides reading corresponding computer program instructions in a nonvolatile storage into a memory for running. From a hardware level, FIG. 10 illustrates a hardware structural diagram of an equipment which includes the device for determining an area of interest based on geolocation data according to some embodiments of this application. In addition to a processor, a network interface, a memory, and a nonvolatile storage shown in FIG. 10, the equipment including the device may further include other hardware according to the functions of determining the area of interest based on the geolocation data.

Figure 11:
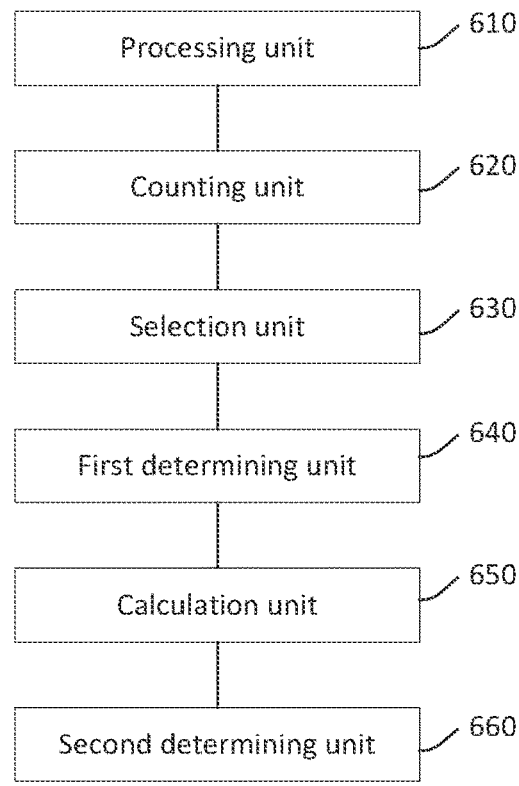
FIG. 11 is a schematic module diagram of a device for determining an area of interest based on geolocation data according to some embodiments of this application.

FIG. 11 is a schematic module diagram of a device for determining an area of interest based on geolocation data according to some embodiments of this application. The device may reside on a server, and the device may include: a processing unit 610, a counting unit 620, a selection unit 630, a first determining unit 640, a calculation unit 650, and a second determining unit 660.

The processing unit 610 is configured to grid a map area to be processed. The counting unit 620 is configured to count a block value of each block within a preset duration, the block value being the quantity of mobile terminals of users that report geolocation data in the corresponding block. The selection unit 630 is configured to select block values greater than a preset threshold from the block values determined for the blocks. The first determining unit 640 is configured to determine anchor points in the blocks having the selected block values. The calculation unit 650 is configured to calculate, according to the anchor points and based on a preset algorithm, a curve encompassing all of the anchor points. The second determining unit 660 is configured to determine an area in the curve as an area of interest.

In some embodiments, the processing unit 610 may be further configured to divide the area on the map to be processed into at least one block according to a preset side length. In other embodiments, an anchor point is a central point of the block having the selected value. In still other embodiments, the device may further include: an obtaining subunit for obtaining types of POIs in the curve; a counting subunit for counting the quantities of POIs of same types; and a determining subunit for determining a type of POIs of the largest quantity as a type of interest for the area of interest.

In yet other embodiments, the device may further include: an obtaining subunit for obtaining POIs in the area on the map after the anchor points are determined in the blocks having the selected block values, where, correspondingly, the calculation unit 650 may be configured to calculate, according to the POIs and the anchor points and based on the preset algorithm, a convex hull curve encompassing all of the anchor points and POIs.

For example, the preset algorithm may be a convex hull algorithm, which may include, but not be limited to, a graham algorithm, a jarvis algorithm, a center method, a level method, or a quickhull algorithm.

According to the embodiments of this application, first, the server divides an area on a map to be processed into a number of blocks, counts the number of terminals of users within the block in a duration as a block value for each block, selects block values greater than a preset threshold from the block values determined for the blocks, determines anchor points in the blocks having the selected block values, calculates a curve encompassing all of the anchor points based on a preset algorithm, and determines an area in the curve as an area of interest. In this way, the server can determine areas of interest in the area on the map by using geolocation data reported by the terminal of the users, to avoid low efficiency and high costs inherent in manually demarcating the areas of interest, thereby improving efficiency and reducing costs for determining the areas of interest.

Reference to the implementation processes of corresponding steps in the foregoing method may be made for details of the implementation processes of the functions and effects of the units in the device.

Because the device embodiments basically correspond to the method embodiments, for related parts, reference may be made to the descriptions in the method embodiment. The foregoing described device embodiments are merely examples. The units described as separate parts may or may not be physically separate, and the parts displayed as units may or may not be physical units, may be located in one position, or may be distributed on a plurality of network units. Some of or all of the modules may be selected according to actual needs for achieving the objectives of the solutions of this application. A person of ordinary skill in the art may understand and implement the embodiments without creative efforts.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application. The embodiments are considered as merely examples, and the scope and spirit of this application are pointed out in the following claims.

It should be understood that this application is not limited to the structures described above and shown in the accompanying drawings, and various modifications and changes can be made without departing from the scope of this application. The scope of this application is described by the appended claims.

What is claimed is:

1. A device, comprising: one or more processors and one or more non-transitory computer-readable memories coupled to the one or more processors and configured with instructions executable by the one or more processors to cause the device to perform operations comprising:
    dividing an area on a map into a plurality of blocks;
    for each block in the area, determining a quantity of mobile terminals located within the block in a duration as a value of the block in the duration;
    selecting a plurality of pairs of adjacent blocks from the plurality of blocks, a first block of each selected pair having a first value above a threshold, and a second block of each selected pair having a second value below the threshold;
    for each pair of selected blocks, locating a respective anchor point according to a ratio between the respective first value and the respective second value; and
    obtaining a curve based on some or all of the anchor points, wherein an area bounded by the curve is an area of interest.

2. The device according to claim 1, wherein dividing the area comprises:
    dividing the area based on a side length.

3. The device according to claim 1, wherein determining the quantity of mobile terminals within the block in the duration as the value of the block in the duration comprises:
    receiving geolocation data from the mobile terminals;
    obtaining locations of the mobile terminals based on the geolocation data; and
    for each mobile terminal, determining a block where the mobile terminal is located based on the locations of the mobile terminals.

4. The device according to claim 1, wherein the curve encompasses all of the anchor points.

5. The device according to claim 1, wherein the operations further comprise:
 obtaining types of Points of Information (POIs) within the area of interest;
 obtaining a quantity of each type of POI; and
 determining the type of POI having the largest quantity as a type of interest for the area of interest.

6. The device according to claim 1, wherein the operations further comprise:
 obtaining Points of Information (POIs) in the area on the map, and
 wherein obtaining the curve based on some or all of the anchor points comprises: obtaining the curve encompassing all of the POIs and the anchor points.

7. The device according to claim 1, wherein obtaining the curve based on some or all of the anchor points comprises:
 obtaining the curve based on some or all of the anchor points through a convex hull algorithm, and wherein the curve is a convex hull curve.

8. A non-transitory computer-readable storage medium storing instructions that, when executed by a processor, cause the processor to perform operations comprising:
 dividing an area on a map into a plurality of blocks;
 for each block in the area, determining a quantity of mobile terminals located within the block in a duration as a value of the block in the duration;
 selecting a plurality of pairs of adjacent blocks from the plurality of blocks, a first block of each selected pair having a first value above a threshold, and a second block of each selected pair having a second value below the threshold;
 for each pair of selected blocks, locating a respective anchor point according to a ratio between the respective first value and the respective second value; and
 obtaining a curve based on some or all of the anchor points, wherein an area bounded by the curve is an area of interest.

9. The non-transitory computer-readable storage medium according to claim 8, wherein dividing the area comprises:
 dividing the area based on a side length.

10. The non-transitory computer-readable storage medium according to claim 8, wherein determining the quantity of mobile terminals within the block in the duration as the value of the block in the duration comprises:
 receiving geolocation data from the mobile terminals;
 obtaining locations of the mobile terminals based on the geolocation data; and
 for each mobile terminal, determining a block where the mobile terminal is located based on the locations of the mobile terminals.

11. The non-transitory computer-readable storage medium according to claim 8, wherein the curve encompasses all of the anchor points.

12. The non-transitory computer-readable storage medium according to claim 8, wherein the operations further comprise:
 obtaining types of Points of Information (POIs) within the area of interest;
 obtaining a quantity of each type of POI; and
 determining the type of POI having the largest quantity as a type of interest for the area of interest.

13. The non-transitory computer-readable storage medium according to claim 8, wherein the operations further comprise:
 obtaining Points of Information (POIs) in the area on the map, and
 wherein obtaining the curve based on some or all of the anchor points comprises: obtaining the curve encompassing all of the POIs and the anchor points.

14. The non-transitory computer-readable storage medium according to claim 8, wherein obtaining the curve based on some or all of the anchor points comprises:
 obtaining the curve based on some or all of the anchor points through a convex hull algorithm, and wherein the curve is a convex hull curve.

15. A method, comprising:
 dividing an area on a map into a plurality of blocks;
 for each block in the area, determining a quantity of mobile terminals located within the block in a duration as a value of the block in the duration;
 selecting a plurality of pairs of adjacent blocks from the plurality of blocks, a first block of each selected pair having a first value above a threshold, and a second block of each selected pair having a second value below the threshold;
 for each pair of selected blocks, locating a respective anchor point according to a ratio between the respective first value and the respective second value; and
 obtaining a curve based on some or all of the anchor points, wherein an area bounded by the curve is an area of interest.

16. The method according to claim 15, wherein dividing the area comprises:
 dividing the area based on a side length.

17. The method according to claim 15, wherein determining the quantity of mobile terminals within the block in the duration as the value of the block in the duration comprises:
 receiving geolocation data from the mobile terminals;
 obtaining locations of the mobile terminals based on the geolocation data; and
 for each mobile terminal, determining a block where the mobile terminal is located based on the locations of the mobile terminals.

18. The method according to claim 15, wherein the curve encompasses all of the anchor points.

19. The method according to claim 15, wherein the method further comprises:
 obtaining types of Points of Information (POIs) within the area of interest;
 obtaining a quantity of each type of POI; and
 determining the type of POI having the largest quantity as a type of interest for the area of interest.

20. The method according to claim 15, wherein the method further comprises:
 obtaining Points of Information (POIs) in the area on the map, and
 wherein obtaining the curve based on some or all of the anchor points comprises: obtaining the curve encompassing all of the POIs and the anchor points.

* * * * *